Sept. 16, 1958     J. E. ARCHAMBAULT ET AL     2,851,802
INDICATOR
Filed Dec. 16, 1954
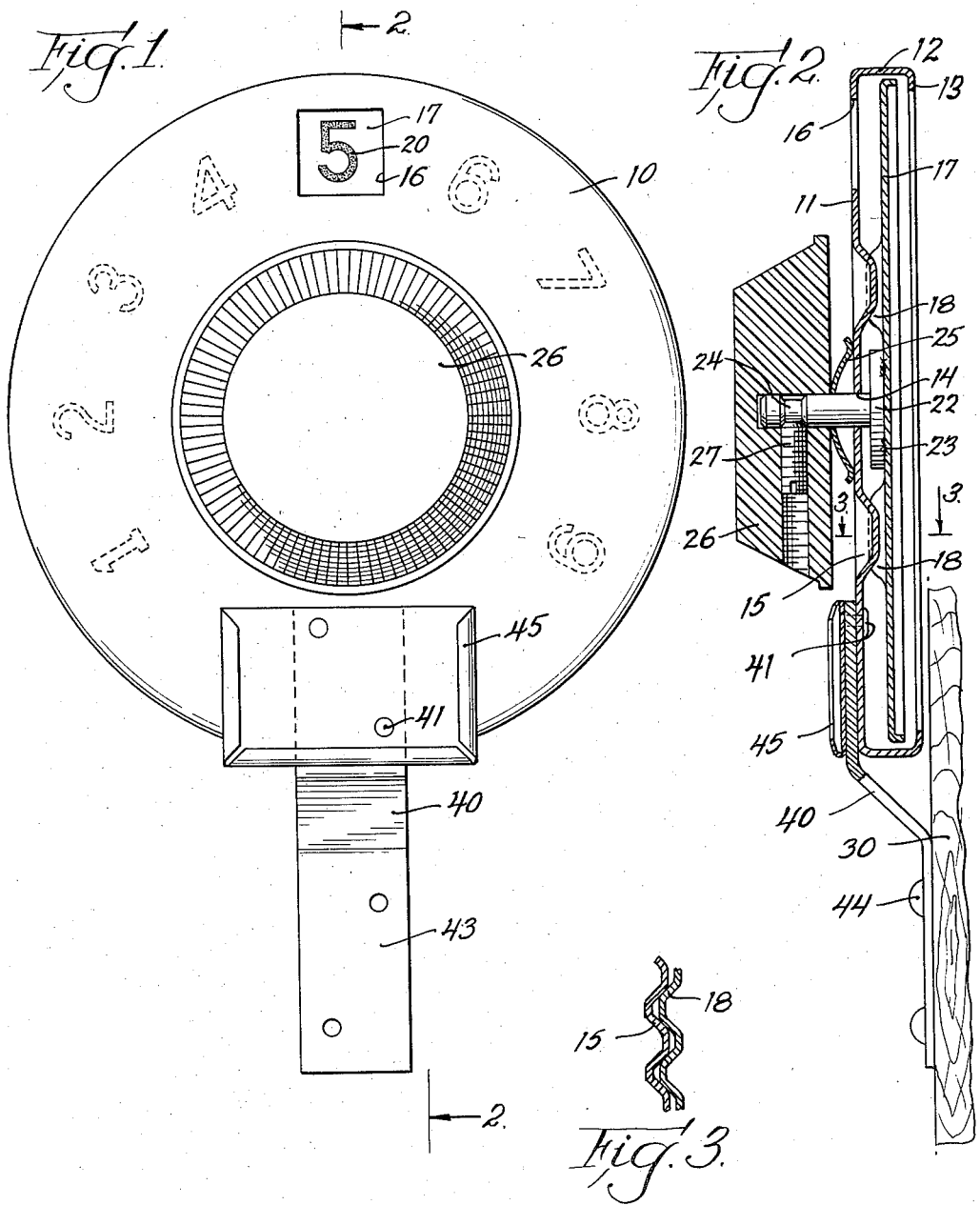
INVENTORS
James E. Archambault and
Nicholas Malz

United States Patent Office 2,851,802
Patented Sept. 16, 1958

2,851,802

INDICATOR

James E. Archambault and Nicholas Malz, Chicago, Ill.

Application December 16, 1954, Serial No. 475,786

1 Claim. (Cl. 40—70)

The present invention relates to indicators and more particularly to feed indicators for individual cows on dairy farms which indicators have to be changed from day to day or week to week depending upon milk produced by the cow.

In the dairy business it is desirable to feed each cow with a certain number of pounds of grain mixture in relation to the number of pounds of milk produced by the cow. This is done not only for the health of the cow but also to enable the cow to maintain high productivity. Generally the grain mixture is so made that it can be fed pound for pound of milk without need for mathematical computation. Overfeeding as well as underfeeding the grain mixture is to be avoided.

One of the objects of the present invention is to provide a simple, rugged and readily operable indicator that can be rapidly attached to the wall or bars of a milking stall, with the name or pedigree registration of the cow upon it so that no mistake will be made if a cow happens to get in the wrong stall.

A further object is to provide a feed indicator which not only identifies a cow's stall and feed plan but can be readily reset quietly if desired so as not to disturb the animals and once set will not be disturbed by jars or vibration.

A further object is to provide a device of the class described which can be turned easily with or without a clicking sound so that the uninitiated can still operate the device without damaging it and no strains can be placed upon the device in its operation which will damage it or mar the indicia.

A further object is to provide a construction which is easily made out of simple die stamped parts, readily assembled and easily operated. These being among the objects of the invention, other and further objects will appear from the claim, the description and the drawings in which:

Fig. 1 is a front elevational view of the preferred embodiment of the invention;

Fig. 2 is a sectional view taken upon line 2—2 in Fig. 1; and

Fig. 3 is an enlarged section taken upon line 3—3 of Fig. 2.

The invention is characterized by a ruggedly constructed housing member having an indicia carrying disk mounted therein for relative axial and rotary movements so that the indicia can be selectively brought into registration behind a window in the housing, the housing and disk being reinforced and contoured to have mating offsets for this purpose.

The housing 10 is preferably formed of sheet metal having a front wall 11 with the marginal edges drawn or spun to form a cylindrical border portion 12. Although it can be dispensed with, the marginal edges of the border portion 12 can be beaded for strength or turned inwardly after assembly to provide an assembly retaining flange 13.

The front wall has a hole 14 through the center and spaced radially therefrom radiating reinforcing ribs 15 pressed rearwardly out of the body. Beyond the outermost limit of the ribs a window 16 is stamped which preferably is left open as distinguished from being closed with a transparent member.

A disk 17 is disposed within and in close clearance with the cylindrical flange 12. The disk is also preferably made of sheet metal with detents of reinforcing ribs 18 corresponding with ribs 15 pressed forwardly therefrom to mate with the ribs 15 in any one of a number of positions predetermined by the width of the ribs and the width of the space between the ribs. Indicia such as numerals 20 are printed or embossed upon the disk where they will be disposed in register with the window in said predetermined positions of the ribs.

A stud 21 having a head 22 is welded as at 23 to the front face of the disk 12. The stud serves as a shaft and is received in the opening 14 before the retaining flange 13 is turned inwardly. The shaft has a circumferential groove 24 near its outer end and after being received in the opening 14, a spring washer 25 is slipped thereon. Thereafter a knob 26 is slipped over the end of the shaft and a set screw 27 tightened to engage in the groove 24 to maintain the spring 25 under tension so that the ribs 15 and 18 are resiliently held in engagement as shown in Fig. 3. The sectional contour of the ribs are also shown in Fig. 3 and it will be noticed that their mating sides are inclined so that a mere twisting of the knob 26 will cause them to pass over each other to new positions by compressing the spring 25 each time.

This movement of the ribs causes a snapping or ripping noise that is disquieting to cows, and, although it can be used, the construction is such that a person can push inwardly upon the knob 26 to clear rib contact after which turning the knob while the ribs are held in clearing position will quietly bring up the desired indicia behind the window whereupon release of the inward pressure will permit re-engagement of the ribs to hold the selected numeral in place against inadvertent movements or jarring of the device.

Although the ribs are provided where they are, it will be appreciated that they could be located at the periphery of the elements if desired so long as they maintain space between the back face of the housing and the front face of the disk to prevent the indicia from being scratched or harmed. Moreover the head 22 of the stud can be located upon the back of the disk if desired to avoid a centering fixture for the welding operation, a hole in the disk would then receive the shaft 21 also.

For purposes of mounting the housing upon the wall 30 or a stall upright, a bracket 40 is provided which is riveted as at 41 to the front of the housing and offset rearwardly at its lower end 43 to receive screws 44 so that the housing is preferably supported a short distance from the wall 30. A tag or identification plate holder 45 is also held in place on the bracket by the same rivets so that the construction is a unitary one, held against disassembly by the retainer flange 13.

Having thus described the preferred form, it will be seen that in assembling the bracket 40 and holder 45 are first riveted in place, the disk then inserted and the flange 13 upset to prevent disassembly. The spring washer is mounted and the knob fastened in place. Furthermore it will be apparent to those skilled in the art how the objects of the invention are fulfilled and various and further changes made within the spirit of the invention, the scope of which is commensurate with the appended claim.

What is claimed is:

An indicator for mounting upon a wall comprising a housing member having an opening through the center of its front wall and a window spaced therefrom, said housing having radiating reinforcing ribs concentrically arranged with respect to said opening, a disc having indicia thereon viewed through said window, means for rotatably supporting said disc including a shaft extending through said opening, said disc having radiating reinforcing ribs concentrically arranged with respect to said shaft to engage the other ribs, a knob received upon the shaft, spring means for urging said engaging ribs into engagement with each other to locate said indicia in predetermined relationship with said window, said engagement being released by inward pressure upon said knob to move the disc out of engagement with said wall, said ribs supporting said front wall and disc a predetermined distance from each other to provide clearance for said movement of the disc.

References Cited in the file of this patent

UNITED STATES PATENTS

| | | |
|---|---|---|
| 521,983 | Lawrence | June 26, 1894 |
| 657,834 | Ruttman | Sept. 11, 1900 |
| 1,581,374 | Youngs | Apr. 20, 1926 |
| 2,702,954 | Cline | Mar. 1, 1955 |

FOREIGN PATENTS

| | | |
|---|---|---|
| 596,344 | France | Aug. 8, 1925 |